United States Patent [19]

Sircar et al.

[11] Patent Number: 4,557,736
[45] Date of Patent: Dec. 10, 1985

[54] BINARY ION EXCHANGED TYPE X ZEOLITE ADSORBENT

[75] Inventors: Shivaji Sircar, Wescosville; Roger R. Conrad, Trexlertown; William J. Ambs, Clifton Heights, all of Pa.

[73] Assignee: Air Products and Chemicals, Inc., Allentown, Pa.

[21] Appl. No.: 665,794

[22] Filed: Oct. 29, 1984

[51] Int. Cl.[4] ............................................. B01D 53/04
[52] U.S. Cl. ........................................... 55/62; 55/68; 55/75; 55/389; 502/79
[58] Field of Search .................... 55/68, 75, 25, 26, 58, 55/62, 389; 502/60, 64, 79

[56] References Cited

U.S. PATENT DOCUMENTS

| 2,882,244 | 4/1959 | Milton | 502/79 X |
| 3,033,641 | 5/1962 | Thomas | 502/60 X |
| 3,282,028 | 11/1966 | Berlin | 55/75 X |
| 3,296,312 | 1/1967 | Naro et al. | 502/60 X |
| 3,313,091 | 4/1967 | Berlin | 55/58 |
| 3,471,412 | 10/1969 | Miale et al. | 502/60 X |
| 3,597,169 | 8/1971 | Savage | 55/75 X |
| 3,647,682 | 3/1972 | Rabo et al. | 502/79 X |
| 3,957,463 | 5/1976 | Drissel et al. | 55/58 X |
| 4,013,429 | 3/1977 | Sircar et al. | 55/58 X |
| 4,240,986 | 12/1980 | Priegnitz | 55/75 X |
| 4,477,267 | 10/1984 | Reiss | 55/75 X |
| 4,481,018 | 11/1984 | Coe et al. | 55/75 X |

FOREIGN PATENT DOCUMENTS

| 1351600 | 5/1974 | United Kingdom | 55/75 |

*Primary Examiner*—Robert Spitzer
*Attorney, Agent, or Firm*—Mark L. Rodgers; E. Eugene Innis; James C. Simmons

[57] ABSTRACT

The present invention involves an improved adsorbent for gas separation processes. The adsorbent comprises a binary ion exchanged Type X zeolite wherein between 5% and 40% of the available ion sites are occupied by Ca, and between 60% and 95% of the available ion sites are occupied by Sr. The present adsorbent is especially useful for the adsorption of $N_2$ from an air stream at superambient pressure to produce an $O_2$-rich product stream.

11 Claims, No Drawings

BINARY ION EXCHANGED TYPE X ZEOLITE ADSORBENT

TECHNICAL FIELD OF THE INVENTION

The present invention relates to a process and an adsorbent for separating components of gaseous mixtures from each other. The invention is particularly adapted to the separation of oxygen and nitrogen in air to produce a nitrogen-enriched stream and an oxygen-enriched stream.

BACKGROUND OF THE INVENTION

Zeolites, both natural and synthetic, have been employed as adsorbents for gas separation processes such as vacuum and pressure swing adsorption cycles, and for residual gas removal in vacuum thermal insulation. A zeolite ion exchanged with a precious metal has been used as an adsorbent for the removal of residual gas in vacuum operations. The zeolite is single ion exchanged and exhibits a greater adsorption capacity for ordinary atmospheric gases than common, e.g. Type X, zeolites which have not undergone ion exchange.

One type of operation in which zeolites or molecular sieves are utilized is for the separation of the gaseous components in an air stream, i.e. the separation of an air stream to form separate oxygen-rich and nitrogen-rich streams. U.S. Pat. No. 3,313,091 describes a technique whereby a Type X or Type A molecular sieve is used as an adsorbent for $O_2/N_2$ separations from air. The molecular sieves have between 30% to 100% of their sodium cations replaced by a single divalent Group II metal cation or a monovalent silver cation. The separation process is carried out at temperatures of about 35° F. to 100° F. and at pressures between 1 atm and 8 atm.

BRIEF SUMMARY OF THE INVENTION

The present invention provides for an improved adsorbent for gas separation processes. The adsorbent comprises a binary ion exchanged Type X zeolite wherein between 5% and 40% of the available ion sites are occupied by Ca and between 60% and 95% of the available ion sites are occupied by Sr. This binary ion exchanged zeolite adsorbent is advantageous over the prior art adsorbents, including the single ion exchanged adsorbents described in U.S. Pat. No. 3,313,091, in that it has a higher $N_2$ adsorption capacity at high pressure. This allows adsorbent inventory to be reduced for processes such as PSA (Pressure Swing Adsorption) which are carried out at superambient pressure levels while increasing the $O_2$ recovery.

In addition to having a high $N_2$ capacity, this adsorbent exhibits a low heat of $N_2$ adsorption, good $N_2$ selectivity, and is easily desorbed of $N_2$ by purging with $O_2$ enriched gas.

The present adsorbent is particularly applicable to gas separation processes, such as the separation of an air stream to produce an $N_2$-enriched stream and an $O_2$-enriched stream. A portion of the nitrogen in the air stream is removed by the adsorbent leaving an oxygen-rich product stream. The adsorbent is subsequently back-purged with part of the oxygen-enriched product stream to produce a nitrogen-rich stream.

DETAILED DESCRIPTION OF THE INVENTION

A key element in any gas separation process is the characteristics of the adsorbent. Since different PSA processes require different sorption characteristics for optimum operation, the right match between the adsorbent and the process is very important. Prior to the present invention, the key mode of moderating a zeolite adsorbent for air separation applications was to ion exchange a typical zeolite adsorbent such as NaX zeolite with a single ion. Such a technique is described in U.S. Pat. No. 3,313,091.

It has now been found that an improved adsorbent for gas separation processes, and in particular for $N_2/O_2$ separation by PSA, can be prepared by ion exchanging a typical type-X zeolite with two ions; i.e., calcium, and strontium; in specific proportions. The type-X zeolite should be binary exchanged such that between 5% and 40%, and preferably between 8% and 12% of the available ion sites are occupied by Ca, and between 60% and 95%, and preferably between 88% and 92%, of the available ion sites are occupied by strontium. Minor amounts, i.e. typically about 2%–5%, of the ion sites may be occupied by the original ion, such as Na for an NaX-type zeolite.

Preferably a NaX type zeolite is used for the binary ion exchange although other type-X zeolites can be used. Typically, the ions are exchanged concurrently, although they can also be exchanged sequentially, for example by exchanging a NaX zeolite with calcium to produce a CaX zeolite which can then be partially ion exchanged with strontium to yield the desired adsorbent. The ion exchange is accomplished by contacting the NaX zeolite with the nitrate of the ion to be exchanged.

These binary ion exchanged X-zeolite adsorbents have higher $N_2$ capacity than both pure Ca and Sr exchanged X-zeolites, yet have a moderate heat of adsorption for $N_2$. Additionally the binary ion exchanged X-zeolites exhibit good selectivity for $N_2$ and do not require excessive $O_2$ purge for regeneration.

The ability to alter the respective amounts of Ca and Sr exchanged provides far more flexibility in optimizing the adsorbent properties for various gas separation operations. One useful application for binary ion exchanged X-zeolites is for the separation of $N_2$ and $O_2$ in a PSA process. In such a process an adsorbent bed comprising binary ion exchanged X-zeolites as described above is initially pressurized with oxygen to about 3 atm. A gas stream comprising nitrogen and oxygen, e.g. air, at a temperature between 0° and 50° C. and a pressure between 1 atm and 5 atm is passed over the adsorbent bed. A portion of the nitrogen in the gas stream is adsorbed by said ion exchanged zeolites thereby producing an oxygen-enriched product stream. The nitrogen-containing adsorbent bed is subsequently depressurized and purged with an oxygen-rich stream to regenerate the adsorbent bed and produce a nitrogen-rich stream. Part of the oxygen enriched products stream may be used as a back-purge to regenerate the adsorbent bed, or alternatively a separate purge stream may be used.

The following examples illustrate the properties of the binary ion exchanged type X-zeolite of the present invention and are not meant to be limiting.

Adsorbent Preparation

Four samples (S1-S4) of mixed Sr/Ca X zeolites having varying Sr and Ca concentrations were prepared as follows:

| Materials: | S1 | S2 | S3 | S4 |
|---|---|---|---|---|
| A. 13X Zeolite | 100 g | 100 g | 100 g | 100 g |
| B. Sr(NO$_3$)$_2$ | 211.1 g | 200 g | 177.7 g | 111.1 g |
| C. Ca(NO$_3$)$_2$.4H$_2$O | 12.4 g | 24.8 g | 49.6 g | 124.0 g |
| D. Deionized Water (liters) | 4 | 4 | 4 | 4 |

Procedure:
1. Dissolve the Sr and Ca nitrates in 4 liters of deionized water.
2. Make four (4) exchanges using ¼ of the solution prepared in step 1 and contacting for one hour, each exchange stage.
3. Decant and wash four (4) times using one liter of water each time and contacting for one hour.
4. Wash overnight in two liters of water.
5. Dry at 250° F.

The four samples were then analyzed by X-ray diffraction to determine the Ca and Sr composition. Analytical data are as follows:

|  | Wt. % SrO | Wt. % CaO | Mole % Ca |
|---|---|---|---|
| S1 | 25.9 | 1.20 | 7.9 |
| S2 | 24.9 | 1.63 | 10.9 |
| S3 | 21.7 | 2.48 | 17.5 |
| S4 | 17.3 | 5.77 | 38.3 |

EXAMPLE 1

Five binary ion-exchanged NaX zeolites were tested for N$_2$ adsorption capacity at 30° C. The adsorbents used were S1-S4 described in the previous section, as well as a type X exchanged with 80% Ca (S5). Additionally, single ion exchanged type X zeolites with Ca (C1) and strontium (C2) were used. The N$_2$ adsorption capacity of these zeolites at pressures of 3.0 and 3.5 atmospheres are reported in Table 1 below.

TABLE 1

| ADSORBENT | N$_2$ CAPACITY (m moles/gram) | |
|---|---|---|
|  | 3.0 atm | 3.5 atm |
| C1 (100.0% Ca)[1] | 0.96 | 1.01 |
| C2 (100.0% Sr)[1] | 1.03 | 1.10 |
| S1 (7.9% Ca)[2] | 1.09 | 1.17 |
| S2 (10.9% Ca)[2] | 1.11 | 1.18 |
| S3 (17.5% Ca)[2] | 1.07 | 1.14 |
| S4 (38.3% Ca)[2] | 1.13 | 1.21 |
| S5 (80.0% Ca)[2] | 0.90 | 0.97 |

[1]Some residual Na may be present
[2]Remainder of ion sites are occupied by Sr and possibly some residual Na.

From the above results, it can be seen that the type X zeolites having between 7.9 mole % and 39.3 mole % Ca (S1-S4) exhibited considerably better N$_2$ adsorption properties than the single ion exchanged type X with Ca (C1) or Sr (C2). Additionally, the binary ion exchanged type X with 80% Ca did not exhibit the improved adsorption characteristics as did those exchanged with a smaller percent of Ca. The comparative results were consistent at both 3.0 atm and 3.5 atm.

EXAMPLE 2

The seven zeolite adsorbents tested in example 1 above were further tested for O$_2$ sorption under conditions similar to that of example 1; i.e. 30° C. and 3.0 atm. This was performed in order to determine if any of the adsorpents exhibit an unusual increase in O$_2$ capacity which would be undesirable in a typical N$_2$/O$_2$ separation process. The results of this test are reported in table 2 below.

TABLE 2

| ADSORPENT | O$_2$ CAPACITY (m moles/gram) 3.0 atm |
|---|---|
| C1 | 0.43 |
| C2 | 0.45 |
| S1 | 0.47 |
| S2 | 0.48 |
| S3 | 0.48 |
| S4 | 0.48 |
| S5 | 0.38 |

As can be seen from the above table, the O$_2$ capacities of the zeolites increased in similar order with the increase in N$_2$ capacity. Thus, the N$_2$/O$_2$ selectivity is not adversely changed in these materials.

EXAMPLE 3

The heat of sorption (Q) for N$_2$ of the zeolite adsorbents was calculated to determine if the increased adsorption properties are accompanied by a significant increase in the heat of adsorption. The heat of sorption at the adsorption level of 1.0 m mole/gram of N$_2$ for each adsorbent is reported in table 3 below.

TABLE 3

| ADSORBENT | (Q) Kcal/mole (N2) |
|---|---|
| C1 | 5.3 |
| C2 | 4.6 |
| S1 | 4.9 |
| S2 | — |
| S3 | 5.3 |
| S4 | 5.2 |
| S5 | 5.3 |

The results reported in table 3 indicate that the increased N$_2$ sorption capacity of the binary ion exchanged zeolites does not result in an accompanying large increase in the heat of adsorption.

EXAMPLE 4

The 7.9 mole % binary ion exchanged zeolite (S1) and the Ca and Sr single ion exchanged zeolites, C1 and C2 respectively, were tested in a typical air separation process. The N$_2$ capacity was measured using the breakthrough characteristics for air displacing O$_2$ at 3.7 atm and 40° C. initial column temp. The adsorbent beds were initially saturated with O$_2$, and subsequently contacted with a flow of air stream. The O$_2$ concentration of the gas stream leaving the column was measured as a function of time to determine at what point the concentration was that of air. From this the amount of N$_2$ adsorbed from air was determined. The column was then depressurized to ambient pressure and subsequently back purged with O$_2$ at 1 atm and 25° C. to determine the amount of O$_2$ required to regenerate the column; i.e. desorb residual N$_2$.

The N$_2$ capacity and the O$_2$ purge requirements for the three zeolite adsorbents tested are reported in table 4 below.

TABLE 4

| ADSORPENT | N$_2$ Capacity from air (m moles/gram) at 3.7 atm 40° C. | O$_2$ purge Gas, (m moles/gram) at 1 atm; 25° C. |
|---|---|---|
| C1 | 1.39 | 1.56 |
| C2 | 1.40 | 0.92 |
| S1 | 1.76 | 1.28 |

The above data indicates that the 7.9% Ca exchanged Ca-SrX zeolite exhibits higher $N_2$ capacity from air than both pure CaX and SrX, and also exhibits intermediate purge gas requirement for $N_2$ desorption.

From the above examples it can be seen that binary ion exchanged type X zeolites having between 5% and 40% of the available ion sites occupied by Ca and between 60% and 95% occupied by Sr, and up to 5% Na exhibit unexpectedly high $N_2$ adsorption capacities compared to single ion exchange, CaX, or SrX zeolites. This increased $N_2$ capacity is realized without a significant loss of $N_2$ selectivity or increased heat of adsorption and $O_2$ purge requirements.

Having thus described the present invention, what is now deemed appropriate for Letter Patent is set out in the following appended claims.

What is claimed is:

1. A binary ion exchanged Type X zeolite adsorbent wherein between 5% and 40% of the available ion sites are occupied by Ca and between 60% and 95% of the available ion sites are occupied by Sr.

2. A binary ion exchanged Type X zeolite adsorbent in accordance with claim 1 wherein between 8% and 12% of the available ion sites are occupied by Ca.

3. A binary ion exchanged Type X zeolite adsorbent in accordance with claim 2 wherein between 88% and 92% of the available ion sites are occupied by Sr.

4. A binary ion exchanged Type X zeolite adsorbent in accordance with claim 1 wherein 0–5% of the ion sites are occupied by Na.

5. A process for producing an oxygen-enriched stream from a gas stream comprising nitrogen and oxygen, said process comprising: contacting said gas stream with a binary ion exchanged Type X zeolite adsorbent so as to adsorb a portion of the nitrogen present in said gas stream wherein between 5% and 40% of the available ion sites on the adsorbent are occupied by Ca and between 60% and 95% are occupied by Sr.

6. A process in accordance with claim 5 wherein said gas stream is contacted with a binary ion exchanged Type X zeolite adsorbent wherein between 8% and 12% of the available ion sites are occupied by Ca.

7. A process in accordance with claim 6 wherein said gas stream is contacted with a binary ion exchanged Type X zeolite adsorbent wherein between 88% and 92% of the available ion sites are occupied by Sr.

8. The process in accordance with claim 5 wherein the adsorbent bed is subsequently depressurized and purged with an oxygen-rich stream to regenerate the adsorbent bed and produce a nitrogen-rich stream.

9. A process for removing nitrogen from a gas stream comprising nitrogen and oxygen, said process comprising:
   a. establishing and maintaining said gas stream at a temperature between 0° and 50° C. and at a pressure between 1 atm and 5 atm; and
   b. passing said feed gas over an adsorbent bed comprising a binary ion exchanged Type X zeolite wherein between 5% and 40% of the available ion sites are occupied by Ca, and between 60% and 95% of the available ion sites are occupied by Sr, such that at least a portion of the nitrogen in said gas stream is adsorbed by the adsorbent bed, thereby leaving an oxygen-rich product stream.

10. The process in accordance with claim 9 wherein said adsorbent bed is initially pressurized to about 3.7 atm with an oxygen-enriched gas.

11. The process in accordance with claim 10 wherein said adsorbent bed is depressurized and subsequently back-purged with an oxygen-rich gas stream to remove part of the nitrogen, thereby regenerating the adsorbent bed.

* * * * *